United States Patent
Horton et al.

(10) Patent No.: US 8,965,736 B2
(45) Date of Patent: Feb. 24, 2015

(54) HIGH ACCURACY AND HIGH DYNAMIC RANGE MEMS INERTIAL MEASUREMENT UNIT WITH AUTOMATIC DYNAMIC RANGE CONTROL

(75) Inventors: Michael A. Horton, Mountain View, CA (US); Qiyue-John Zhang, Cupertino, CA (US)

(73) Assignee: Moog Inc., East Aurora, NY (US)

( * ) Notice: Subject to any disclaimer, the term of this patent is extended or adjusted under 35 U.S.C. 154(b) by 1022 days.

(21) Appl. No.: 13/044,191

(22) Filed: Mar. 9, 2011

(65) Prior Publication Data
US 2012/0232847 A1    Sep. 13, 2012

(51) Int. Cl.
*H03F 1/26* (2006.01)
*G01C 21/16* (2006.01)
*G01C 19/5776* (2012.01)
*G01P 15/08* (2006.01)

(52) U.S. Cl.
CPC ............ *G01C 21/16* (2013.01); *G01C 19/5776* (2013.01); *G01P 15/0802* (2013.01)
USPC .......................................................... 702/189

(58) Field of Classification Search
CPC combination set(s) only.
See application file for complete search history.

(56) References Cited

U.S. PATENT DOCUMENTS 6,386,040 B1 *  5/2002  Broillet et al. .................. 73/593
7,040,166 B2 *  5/2006  Babala ....................... 73/514.35

* cited by examiner

*Primary Examiner* — Aditya Bhat
(74) *Attorney, Agent, or Firm* — Hodgson Russ LLP

(57) ABSTRACT

Embodiments relate to a MEMS IMU having an automatic gain control. The dynamic measurement range of the MEMS IMU is controlled by controlling the gain of a signal amplifier before the analog to digital converter (ADC) to make full use of the ADC range. In one embodiment, two or more MEMS inertial sensor sets are installed in the IMU. One of the sensor sets is for high accuracy with low dynamic range, and the other set or sets is for higher dynamic range with less resolution or accuracy. In one implementation, a digital processor determines which of the sensor sets to be used according to the system dynamic estimation. In another implementation, the system weights the sensor outputs from the sensor sets according to the system dynamics.

10 Claims, 3 Drawing Sheets

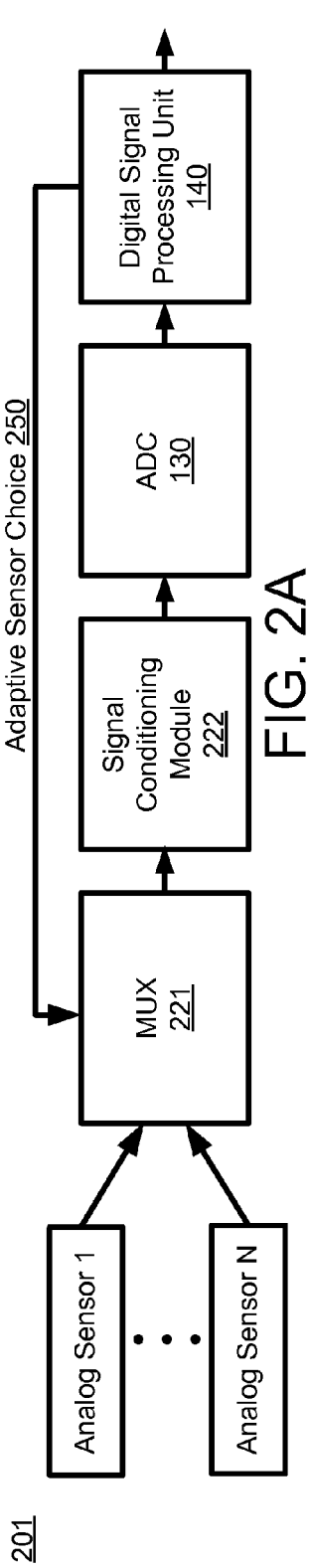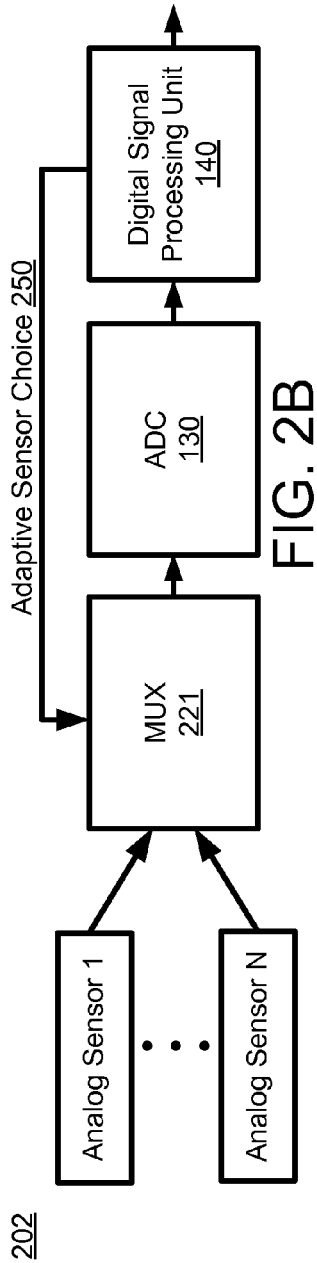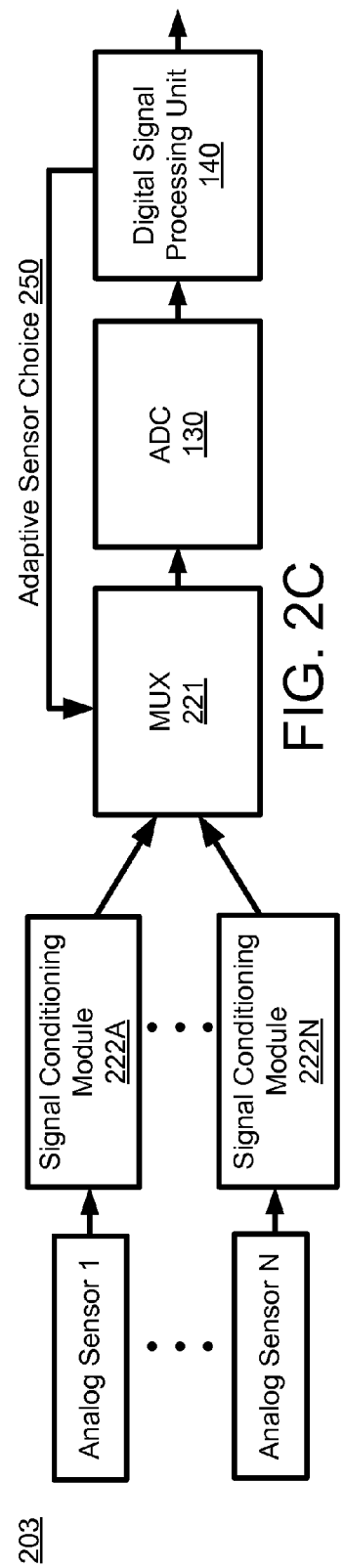

HIGH ACCURACY AND HIGH DYNAMIC RANGE MEMS INERTIAL MEASUREMENT UNIT WITH AUTOMATIC DYNAMIC RANGE CONTROL

FIELD OF THE INVENTION

This invention relates generally to the field of guidance, navigation, and control systems and specifically to inertial measurement units.

BACKGROUND

Guidance, navigation, and control systems, such as land vehicle, aerospace, and military inertial systems, require inertial measurement units (IMUs) that have both high accuracy and high dynamic range. To meet the high accuracy and high dynamic range requirements, quartz accelerometers, fiber optical gyroscopes, and/or laser gyroscopes have been conventionally used. However, the use of quartz accelerometers, fiber optical gyroscopes, and/or laser gyroscopes have drawbacks as well. Specifically, IMUs based on these technologies are relatively expensive, large in size, and heavy in power consumption, as compared to micro-electro-mechanical systems (MEMS) IMUs.

In current low cost IMUs, such as MEMS IMUs, the IMU either has high accuracy or has high dynamic measurement range. The invention disclosed herein addresses the need for a low cost IMU that has both high accuracy and high dynamic range.

SUMMARY

Embodiments relate to a MEMS IMU having an automatic gain control. The dynamic measurement range of the MEMS IMU is controlled by controlling the gain of a signal amplifier that amplifies the signal before the signal reaches an analog to digital converter (ADC) in order to make full use of the ADC range. Measurements of the vehicle dynamics can be determined by digital circuits or a processor. Then, the measurements can be used as feedback to control the gain of the amplifier. Thus, high dynamic measurement range is achieved, and the accuracy is increased when the system is in low dynamic motion.

In one embodiment, two or more MEMS inertial sensor sets are installed in the IMU. One of the sensor sets is for high accuracy with low dynamic range, and the other set or sets is for higher dynamic range with less resolution or accuracy. In one implementation, a digital processor determines which of the sensor sets to be used according to the system dynamic estimation. In another implementation, the system weights the sensor outputs from the sensor sets according to the system dynamics.

BRIEF DESCRIPTION OF THE DRAWINGS

FIG. 2A is a block diagram illustrating a first example system for adaptive sensor choice for analog sensors, according to one embodiment of the invention.

FIG. 2B is a block diagram illustrating a second example system for adaptive sensor choice for analog sensors, according to one embodiment of the invention.

FIG. 2C is a block diagram illustrating a third example system for adaptive sensor choice for analog sensors, according to one embodiment of the invention.

DETAILED DESCRIPTION OF THE INVENTION

Figure 1:
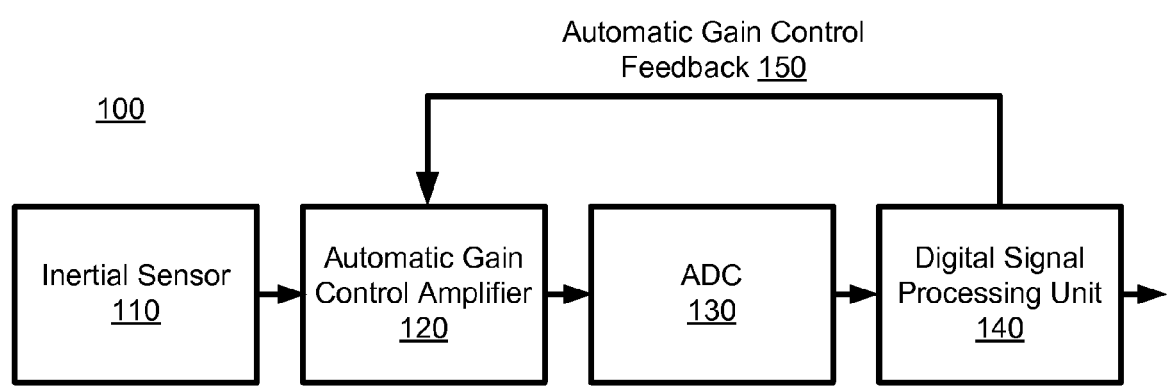
FIG. 1 is a block diagram illustrating a system including automatic gain control to increase IMU dynamic range, according to one embodiment of the invention.

Embodiments of the invention employ automatic gain control to an inertial system to achieve high dynamic measurement range and to increase the accuracy when the system is in low dynamic motion. FIG. 1 is a block diagram illustrating a system 100 in accordance with an embodiment of the invention. The system 100 includes at least one inertial sensor 110, an automatic gain control amplifier 120, an analog to digital converter 130, and a digital signal processing unit 140. The system 100 may be placed, for example, inside a land vehicle, an aerospace vehicle, or any other moveable object.

The one or more inertial sensor 110 measures the inertial forces present as the system 100 moves. Measurement signals representative of the inertial forces are output from the one or more inertial sensor 110 to the automatic gain control amplifier 120.

The automatic gain control amplifier 120 receives the measurement signals from the inertial sensor 110 and amplifies the measurement signal according to a gain amount that varies based on the automatic gain control feedback 150. The output of the automatic gain control amplifier 120 is transmitted to the ADC 130.

The ADC 130 receives the amplified analog signals from the automatic gain control amplifier 120 and converts them to digital signals. The digital output of the ADC 130 is then conveyed to the digital signal processing unit 140.

The digital signal processing unit 140 receives the digital output from the ADC 130 and processes the signals, in some embodiments, to determine the motion of the system 100 based on the inertial forces measured by the inertial sensor 110. The digital signal processing unit 140 can be an electronic circuit or a standard digital processor/controller, for example. The digital signal processing unit 140 may also output an automatic gain control feedback 150 to control the gain of the automatic gain control amplifier 120, for example, in a linear or stepwise manner. In linear control mode, the gain of the amplifier 120 is reversely proportional to the dynamics to keep the input analog signal to an optimal percentage of the ADC input range to maximize the signal to noise ration, such as around 70% in most of applications. In the stepwise mode, the implementation of the AGC circuits are simpler than the in the linear mode, and sub optimization can be achieved. Accordingly, the full use of the range of the ADC 130 increases the resolution in low dynamic conditions and increases the measurement range in high dynamic conditions. A further advantage of this implementation is that the number of sensors is not increased in order to achieve these results.

FIG. 2A is a block diagram illustrating a first example system for adaptive sensor choice for analog sensors, according to one embodiment of the invention. In this example, the system 201 includes a plurality of analog sensors, a multiplexer (MUX) 221, a signal conditioning module 222, an ADC 130, and a digital signal processing unit 140.

The plurality of analog sensors (labeled 1 through N) measure the inertial forces present as the system 201 moves. In some implementations, as few as two sensors are used, and in other implementations, any number up to one hundred sensors or more can be used. In one embodiment, the plurality of analog sensors each of which has a different measurement range. The ranges of individual sensors of the plurality may partially overlap in some embodiments. In one embodiment, the measurement range of a first sensor contains portion that is not present in the measurement range of a second sensor. In another embodiment, the measurement range of a first sensor contains portion that is not present in the measurement range of a second sensor, and vice versa. Measurement signals representative of the inertial forces are output from the analog sensors to the MUX 221.

The MUX 221 is used to switch between the analog sensors 1 through N, according to a control referred to herein as the adaptive sensor choice 250. The adaptive sensor choice 250 comprises the digital signal processing unit 140 and the MUX 221. The digital signal processing unit 140 determines the dynamics of the motion and sends the command/signal to the MUX 221 to choose the analog sensor which is the best of the sensor array to work in this dynamic range. In response to the adaptive sensor choice 250, the MUX 221 transmits the signals received from the selected analog sensor to a signal conditioning module 222.

The signal conditioning module 222 is used to amplify and filter the analog signal. The signal conditioning module 222 receives the analog signal from the MUX 221, and transmits the amplified and/or filtered signal to the ADC 130.

The ADC 130 receives the analog signal from the signal conditioning module 222 and converts it to a digital signal. The ADC 130 then outputs the digital signal to the digital signal processing unit 140.

The digital signal processing unit 140 processes the digital signal from the ADC 130. The digital signal processing unit 140 also determines which sensor to be used according to the estimated system dynamics and sends control signals, referred to in FIG. 2A as an adaptive sensor choice 250, to the MUX 221. When the system 201 is in low dynamic situations, the adaptive sensor choice 250 signals the MUX 221 to select an analog sensor from the plurality of analog sensors 1-N with high accuracy and low measurement range. In high dynamic situations, the adaptive sensor choice 250 signals the MUX 221 to select an analog sensor with a high measurement range to avoid saturation of the sensor with low measurement range.

An advantage of the implementation of FIG. 2A is that the plurality of sensors allows the selection of the sensor to be tailored to the situation. Some sensor technologies perform best in low dynamic cases. Some sensor technologies perform best at high dynamics. Embodiment of the invention to use a combination of these sensor technologies to achieve the best system performance over a wide range of system dynamics.

FIG. 2B is a block diagram illustrating a second example system 202 for adaptive sensor choice for analog sensors, according to one embodiment of the invention. FIG. 2B is a variation of the system 201 of FIG. 2A. In this variation, the signal conditioning module 222 is optionally excluded. Instead, the MUX 221 outputs a signal that is received by the ADC 130. Advantages of this arrangement include the presence of few components and a lower manufacturing cost. In this embodiment, the ADC sampling rate needs to be at least twice as the sensor signal bandwidth to avoid aliasing. Some of the MEMS sensors can be set to a certain bandwidth to meet this requirement. The digital signal processing unit 140 can also be used to perform digital filtering.

FIG. 2C is a block diagram illustrating a third example system 203 for adaptive sensor choice for analog sensors, according to one embodiment of the invention. FIG. 2C is another variation of the system 201 of FIG. 2A. In this variation, signal conditioning is performed by a plurality of modules 222A-222N, one positioned between each analog sensor and the MUX 221. An advantage of this arrangement is that a signal conditioning module is devoted to each particular sensor, and thus can be optimized for peak performance from the corresponding sensor.

Figure 3:
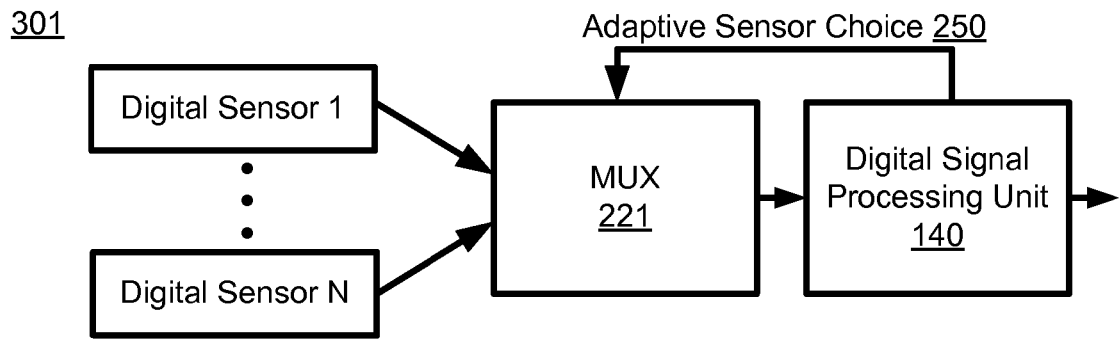
FIG. 3 is a block diagram illustrating an example system for adaptive sensor choice for digital sensors, according to one embodiment of the invention.

FIG. 3 is a block diagram illustrating an example system 301 for adaptive sensor choice for digital sensors, according to one embodiment of the invention. FIG. 3 is another variation of FIG. 2A, but in the system 301, digital inertial sensors 1-N are used in the inertial measurement unit instead of analog sensors. The advantage of using digital sensors is the simplicity of the circuitry. No analog circuits are required except for the power supply. Hence, the system can have smaller form of factor.

Figure 4:
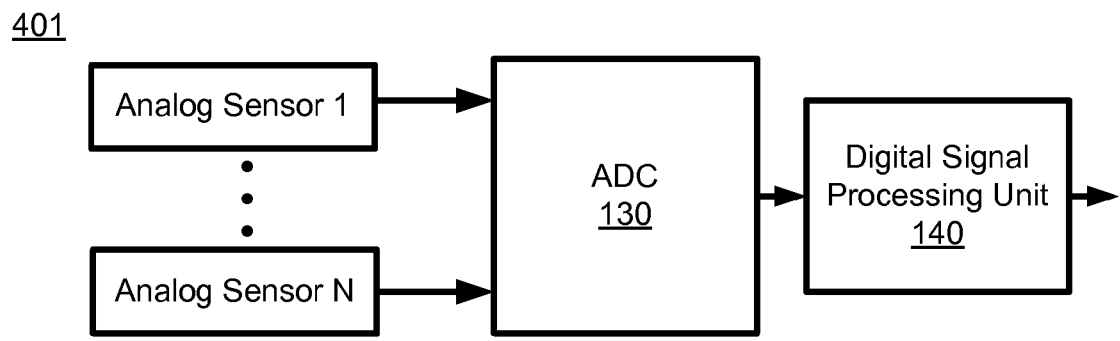
FIG. 4 is a block diagram illustrating a dynamically weighted multi-sensor IMU using analog inertial sensors, according to one embodiment of the invention.

FIG. 4 is a block diagram illustrating a dynamically weighted multi-sensor IMU system 401 using analog inertial sensors, according to one embodiment of the invention. The system 401 includes two or more analog sensors, an ADC 130, and a digital signal processing unit 140.

In the example of FIG. 4, of the two or more analog sensors, at least one of them achieves its best performance in low dynamic situations, and at least one of the other sensors achieves its best performance in high dynamic situations. All the analog signal sensor output is routed through an ADC 130 and collected by the digital signal processing unit 140. However, in contrast to the embodiments described above, in this embodiment, the sensor measurements are weighted at the digital signal processing unit 140 depending on the performance characteristics of the individual sensors and the system 401 motion dynamics. In general, more weight is given to the sensor or sensors that have a range appropriate for the measurement. For example:

$$x = \sum_{i=1}^{N} w_i \tilde{x}_i$$

Where x is the weighted measurement and $w_i$ is the weighting factor for the measurement $\tilde{x}_i$.

Figure 5:
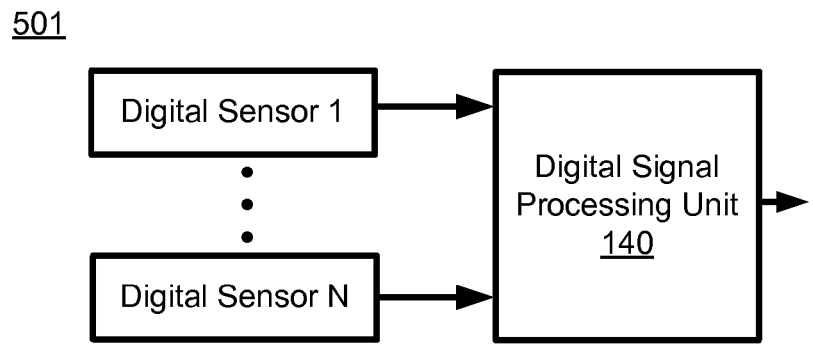
FIG. 5 is a block diagram illustrating a dynamically weighted multi-sensor IMU using digital inertial sensors, according to one embodiment of the invention.

FIG. 5 is a block diagram illustrating a dynamically weighted multi-sensor IMU system 501 using digital inertial sensors, according to one embodiment of the invention. FIG. 5 is a variation of FIG. 4, but in this system 501, digital inertial sensors 1-N are used in the inertial measurement unit instead of analog sensors. In this embodiment, there is no ADC external to the sensors. Hence, a smaller form of factor can be achieved.

Advantages of the implementations illustrated in FIGS. 4 and 5 are that a better overall performance of the inertial measurement systems can be achieved through a combination of measurements in the digital signal processing unit. The combination of measurements from the sensors reduces the noise level and random walk error by the square root of N times within the overlapping sensor measurement range, wherein N is the number of sensors participating in the measurement. Another benefit of using a combination of measurements from multiple sensors is a reduction in the effects of artifacts caused by switching between sensors.

Although the detailed description contains many specifics, these should not be construed as limiting the scope of the invention, but merely as illustrating different examples and aspects of the invention. It should be appreciated that the scope of the invention includes other embodiments not discussed in detail above. Various other modifications, changes and variations which will be apparent to those skilled in the art may be made in the arrangement and details of the apparatus and methods of the invention disclosed herein without departing from the spirit and scope of the invention.

What is claimed is:

1. A micro-electro-mechanical system (MEMS) inertial measurement apparatus for measuring apparatus dynamics, comprising:
    at least two MEMS inertial sensors, the sensors having different measurement ranges;
    a multiplexer that receives measurement signals from the at least two MEMS inertial sensors and provides one of the sensor's measurement signals according to an adaptive sensor choice;
    a signal conditioning module that receives the measurement signal provided by the multiplexer, and provides a conditioned measurement signal;
    an analog to digital converter that receives the conditioned measurement signal from the signal conditioning module, and outputs a conditioned digital measurement signal; and
    a digital signal processing unit that processes the conditioned digital measurement signal, and outputs the adaptive sensor choice to the multiplexer to control the determination of which sensor's measurement signals the multiplexer outputs according to the apparatus dynamics.

2. The apparatus of claim 1, wherein a gain amount caused by the signal conditioning module is controlled in a linear manner.

3. The apparatus of claim 1, wherein a gain amount caused by the signal conditioning module is controlled in a stepwise manner.

4. The apparatus of claim 1, wherein when the apparatus dynamics are low, the adaptive sensor choice signals the multiplexer to select a sensor from the at least two sensors with high accuracy and a low measurement range.

5. The apparatus of claim 1, wherein when the apparatus dynamics are high, the adaptive sensor choice signals the multiplexer to select a sensor from the at least two sensors with a high measurement range.

6. A method of operating a micro-electro-mechanical system (MEMS) inertial measurement apparatus for measuring apparatus dynamics and providing a conditioned measurement signal, the method comprising:
    receive measurement signals from at least two MEMS inertial sensors, the sensors having different measurement ranges;
    select one of the measurement signals;
    condition the selected measurement signal, to provide a conditioned measurement signal;
    convert the conditioned measurement signal to a digital signal to provide a conditioned digital measurement signal;
    using the conditioned digital measurement signal, determine which sensor's measurement signals to select and provide that determination as an adaptive sensor choice;
    provide the adaptive sensor choice to control the selection of which sensor's measurement signals will be used to provide the conditioned digital measurement signal according to the apparatus dynamics.

7. The method of claim 6, wherein when the apparatus dynamics are low, the adaptive sensor choice signals the multiplexer to select a sensor from the at least two sensors with high accuracy and a low measurement range.

8. The method of claim 6, wherein when the apparatus dynamics are high, the adaptive sensor choice signals the multiplexer to select a sensor from the at least two sensors with a high measurement range.

9. The method of claim 6, wherein a gain amount caused by conditioning the multiplexed measurement signal is controlled in a linear manner.

10. The method of claim 6, wherein a gain amount caused by conditioning the multiplexed measurement signal is controlled in a stepwise manner.

* * * * *